(12) United States Patent
Agrawal et al.

(10) Patent No.: US 11,516,434 B1
(45) Date of Patent: Nov. 29, 2022

(54) ROUTING VISUAL CONTENT FROM DIFFERENT CAMERA SYSTEMS TO DIFFERENT APPLICATIONS DURING VIDEO CALL

(71) Applicant: Motorola Mobility LLC, Chicago, IL (US)

(72) Inventors: Amit Kumar Agrawal, Bangalore (IN); Alexandre Novaes Olivieri, Campinas (BR); Mauricio Dias Moises, Campinas (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/458,279

(22) Filed: Aug. 26, 2021

(51) Int. Cl.
*H04N 7/15* (2006.01)
*H04M 3/56* (2006.01)
*H04N 7/14* (2006.01)

(52) U.S. Cl.
CPC ............ *H04N 7/152* (2013.01); *H04M 3/567* (2013.01); *H04M 3/568* (2013.01); *H04N 7/147* (2013.01)

(58) Field of Classification Search
CPC .............. H04N 7/15; H04N 7/14; H04M 3/56
USPC ............................................ 348/14.01–14.16
See application file for complete search history.

(56) References Cited

U.S. PATENT DOCUMENTS

| | | | |
|---|---|---|---|
| 11,169,771 B1* | 11/2021 | Daly | G06F 3/167 |
| 2011/0249073 A1* | 10/2011 | Cranfill | G06F 9/451 |
| | | | 348/14.02 |
| 2016/0065934 A1* | 3/2016 | Kaza | H04N 13/271 |
| | | | 348/48 |
| 2017/0208241 A1* | 7/2017 | Choi | G06F 1/1686 |

FOREIGN PATENT DOCUMENTS

JP 2005354506 A * 12/2005

OTHER PUBLICATIONS

Stereo Image Rectification Method for Mono Cameras Document ID KR 101823657 B1 (Jan. 30, 2018) Date Published, Jeon Jae wook.*
"Behavior changes: all apps", Android Developers [online][retrieved Jul. 2, 2021]. Retrieved from the Internet <https://developer.android.com/about/versions/12/behavior-changes-all#camera>., Jul. 8, 2020, 18 pages.

* cited by examiner

*Primary Examiner* — Melur Ramakrishnaiah
(74) *Attorney, Agent, or Firm* — FIG. 1 Patents

(57) ABSTRACT

Visual content from different camera systems is concurrently routed to different applications during video call. A first application (e.g., a video call application) receives visual content from a first camera system while in a video call. The user can request to activate a second application, such as a photography application that allows the user to capture and display, store, or otherwise process visual content. A visual content routing system routes visual content captured by a second camera system (e.g., a rear facing camera system) to (Continued)

the second application concurrently with routing visual content captured by the first camera system (e.g., a front facing camera system) to the first application.

20 Claims, 8 Drawing Sheets

//ROUTING VISUAL CONTENT FROM DIFFERENT CAMERA SYSTEMS TO DIFFERENT APPLICATIONS DURING VIDEO CALL

BACKGROUND

As technology has advanced our uses for computing devices have expanded. One such use is video conferencing, which allows users of different computing devices to communicate visually and audibly with one another. Video conferencing provides many benefits, allowing people from various geographic areas to more easily communicate face to face. However, current video conferencing solutions are not without their problems. One such problem is that current video conferencing solutions use a video feed from a single camera system, which is displayed on the computing device and can be transmitted to the other devices in the video conference. This restricts the visual content that users can capture with their devices while in a video conference, which can be frustrating for users and lead to user frustration with their devices and video conferencing applications.

BRIEF DESCRIPTION OF THE DRAWINGS

Embodiments of routing visual content from different camera systems to different applications during video call are described with reference to the following drawings. The same numbers are used throughout the drawings to reference like features and components.

DETAILED DESCRIPTION

Routing visual content from different camera systems to different applications during video call is discussed herein. Generally, a first application (e.g., a video call application) receives visual content from a first camera system while in a video call. During the video call the user can request to activate a second application, such as a photography application that allows the user to capture and display, store, or otherwise process visual content. A visual content routing system routes visual content captured by a second camera system (e.g., a rear facing camera system) to the second application concurrently with routing visual content captured by the first camera system (e.g., a front facing camera system) to the first application.

The techniques discussed herein improve the operation of a computing device by allowing two different applications to receive visual content captured by two different camera systems. For example, the computing device is able to capture and store an image captured by a first camera system (e.g., a rear facing camera system on a mobile device) concurrently with capturing (and transmitting to a remote device) an image captured by a second camera system (e.g., a front facing camera system on the mobile device). The capturing of visual content by the second camera system need not be stopped while the first camera system captures visual content, e.g., allowing visual content being captured for a video call by the second camera system to continue to be captured while visual content to be captured and stored for a later use by the user is captured by the first camera system.

Figure 1:
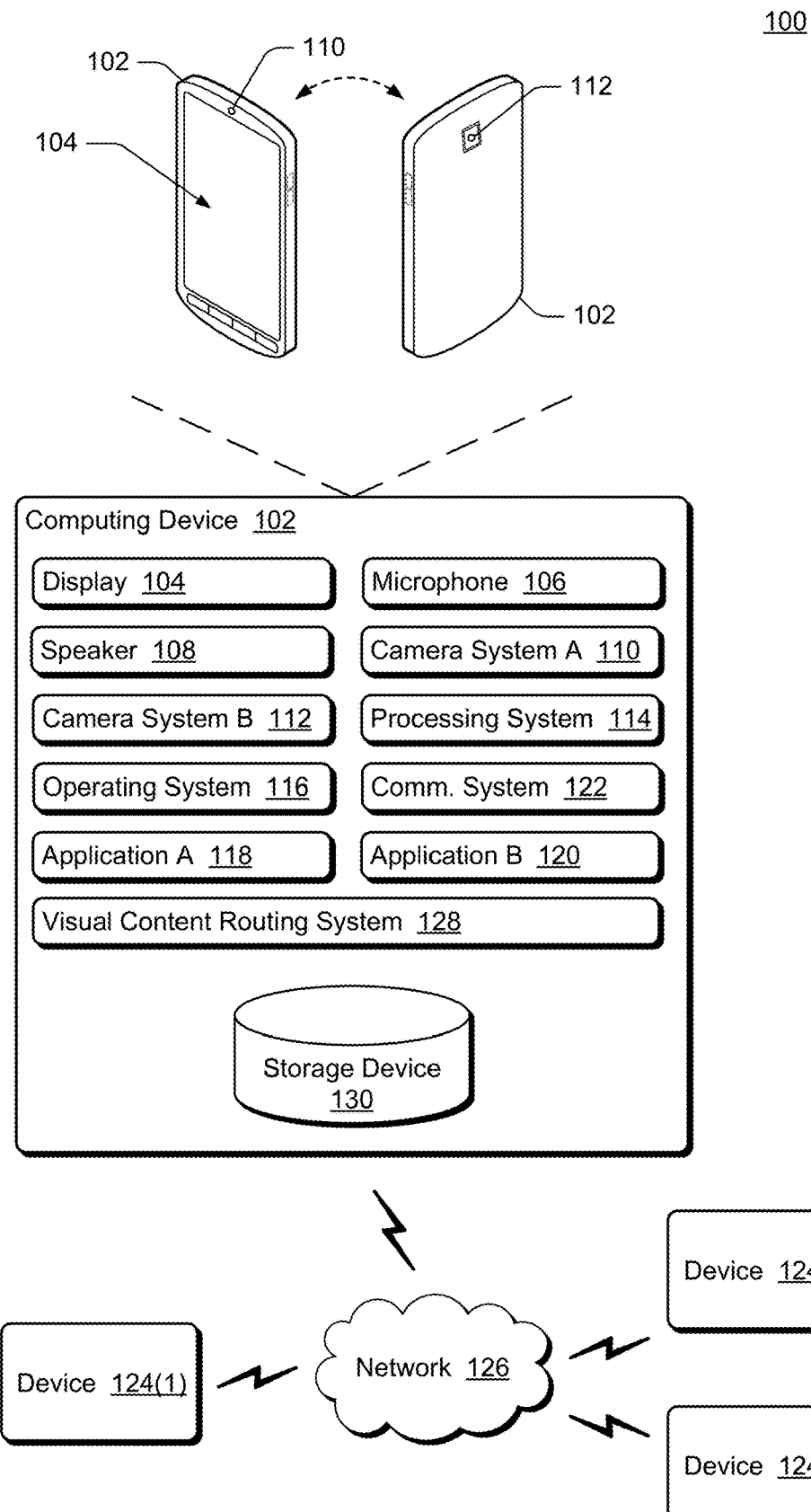
FIG. 1 illustrates an example system including a computing device implementing the techniques discussed herein.

FIG. 1 illustrates an example system 100 including a computing device 102 implementing the techniques discussed herein. The computing device 102 can be, or include, many different types of computing or electronic devices. For example, the computing device 102 can be a smartphone or other wireless phone, a notebook computer (e.g., netbook or ultrabook), a laptop computer, a wearable device (e.g., a smartwatch, a ring or other jewelry, augmented reality headsets or glasses, virtual reality headsets or glasses), a tablet or phablet computer, an entertainment device (e.g., a gaming console, a portable gaming device, a streaming media player, a digital video recorder, a music or other audio playback device), an Internet of Things (IoT) device, a smart TV, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 and the speaker 108 may be separate from the computing device 102 (e.g., a user of the computing device 102 may be using a headset with the speaker 108 and the microphone 106) and voice inputs received by the microphone 106 are communicated to the computing device 102 via an IR or radio frequency wireless connection.

The computing device 102 also includes two camera systems 110 and 112, referred to as camera system A and camera system B. Each camera system 110 and 112 captures images digitally using any of a variety of different technologies, such as a charge-coupled device (CCD) sensor, a complementary metal-oxide-semiconductor (CMOS) sensor, combinations thereof, and so forth. The camera systems 110 and 112 can capture images using the same technology or different technology. Additionally, each camera system 110 and 112 can include a single lens or multiple lenses. In the illustrated example, the camera system 110 has a lens and sensor positioned to capture images from the front of the computing device 102 (e.g., the same surface as the display 104 is positioned on), also referred to as a front facing camera system, whereas the camera system 112 has a lens and sensor positioned to capture images from the back of the computing device 102 (e.g., capture images from the opposite direction (e.g., 180 degrees difference) as the camera system 110), also referred to as a back or rear facing camera system.

Although two camera systems are illustrated in the example of FIG. 1, additionally or alternatively the computing device 102 includes one or more additional cameras systems. These additional camera systems can capture images using any of a variety of different technologies analogous to camera systems 110 and 112, and each such additional camera system can include a single lens or multiple lenses. These additional camera systems can be positioned on any of the surfaces of the computing device 102, such as the front of the computing device 102 (e.g., the same surface as the camera system 110 is positioned on), the back of the computing device 102 (e.g., the same surface as the camera system 112 is positioned on), any of the side (or edge) surfaces that lie in a plane approximately perpendicular to the planes in which the front of the computing device 102 or the back of the computing device 102 lie, and so forth.

Additionally or alternatively, multiple camera systems can be positioned on the same surface. For example, two camera systems can be positioned on the front of the computing device 102. Each of these camera systems positioned on the same surface capture images using the same or different technologies, and can capture images using different lenses. E.g., one camera system may capture images using a wide angle lens while another camera system may capture images using a telephone or portrait lens (e.g., designed to capture predominantly the face and optionally neck and shoulders of a user of the computing device 102, such as for video conferencing purposes).

The computing device 102 also includes a processing system 114 that includes one or more processors, each of which can include one or more cores. The processing system 114 is coupled with, and may implement functionalities of, any other components or modules of the computing device 102 that are described herein. In one or more embodiments, the processing system 114 includes a single processor having a single core. Alternatively, the processing system 114 includes a single processor having multiple cores or multiple processors (each having one or more cores).

The computing device 102 also includes an operating system 116. The operating system 116 manages hardware, software, and firmware resources in the computing device 102. The operating system 116 manages multiple applications 118 and 120 running on the computing device 102, referred to as application A and application B, and operates as an interface between applications 118, 120 and hardware components of the computing device 102. The applications 118 and 120 can perform any of a variety of different actions with visual content captured by the camera systems 110 and 112, such as displaying the visual content, saving the visual content (e.g., to a local or remote storage device), communicating the visual content to a remote device, and so forth. Although two applications are illustrated in the example of FIG. 1, additionally or alternatively the computing device 102 includes one or more additional applications that can perform any of a variety of different actions with visual content captured by the camera systems 110 and 112.

The computing device 102 also includes a communication system 122. The communication system 122 manages communication with various other devices, including establishing video calls (e.g., video conferences or collaboration calls) with other devices 124(1), . . . , 124(n), sending visual content to and receiving visual content from other devices, and so forth. The visual content that is communicated and the recipient of this visual content is managed by an application 118 or 120, or by the operating system 116. This management of the content and recipients can include displaying received visual content, providing a user interface to initiate or accept a video call, select recipients or invitees for a video call, and so forth.

The devices 124 can be any of a variety of types of devices, analogous to the discussion above regarding the computing device 102. This communication can be carried out over a network, which can be any of a variety of different networks 126, including the Internet, a local area network (LAN), a public telephone network, a cellular network (e.g., a third generation (3G) network, a fourth generation (4G) network, a fifth generation (5G) network), an intranet, other public or proprietary networks, combinations thereof, and so forth. The computing device 102 can thus communicate with other devices wirelessly and accordingly is also referred to as a wireless device.

The computing device 102 also includes a visual content routing system 128. The visual content routing system 128 manages routing of visual content captured by camera systems 110 and 112 to the appropriate ones of applications 118 and 120. This routing can include concurrently routing visual content captured by different camera systems 110 and 112 to different ones of the applications 118 and 120, e.g., allowing application 118 (e.g., a photography application) to receive visual content captured by camera system 110 concurrently with application 120 (e.g., a video conferencing application) receiving visual content captured by camera system 112. Although illustrated separately, additionally or alternatively the visual content routing system 128 is implemented as part of another component, application, or program of the computing device 102, such as the operating system 116.

The visual content routing system 128 can be implemented in a variety of different manners. For example, the visual content routing system 128 can be implemented as multiple instructions stored on computer-readable storage media and that can be executed by the processing system 114. Additionally or alternatively, the visual content routing system 128 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

The computing device 102 also includes a storage device 130. The storage device 130 can be implemented using any of a variety of storage technologies, such as magnetic disk, optical disc, Flash or other solid state memory, and so forth. The storage device 130 can store various program instructions and data for any one or more of the operating system 116, applications 118 and 120, and the visual content routing system 128.

Figure 2:
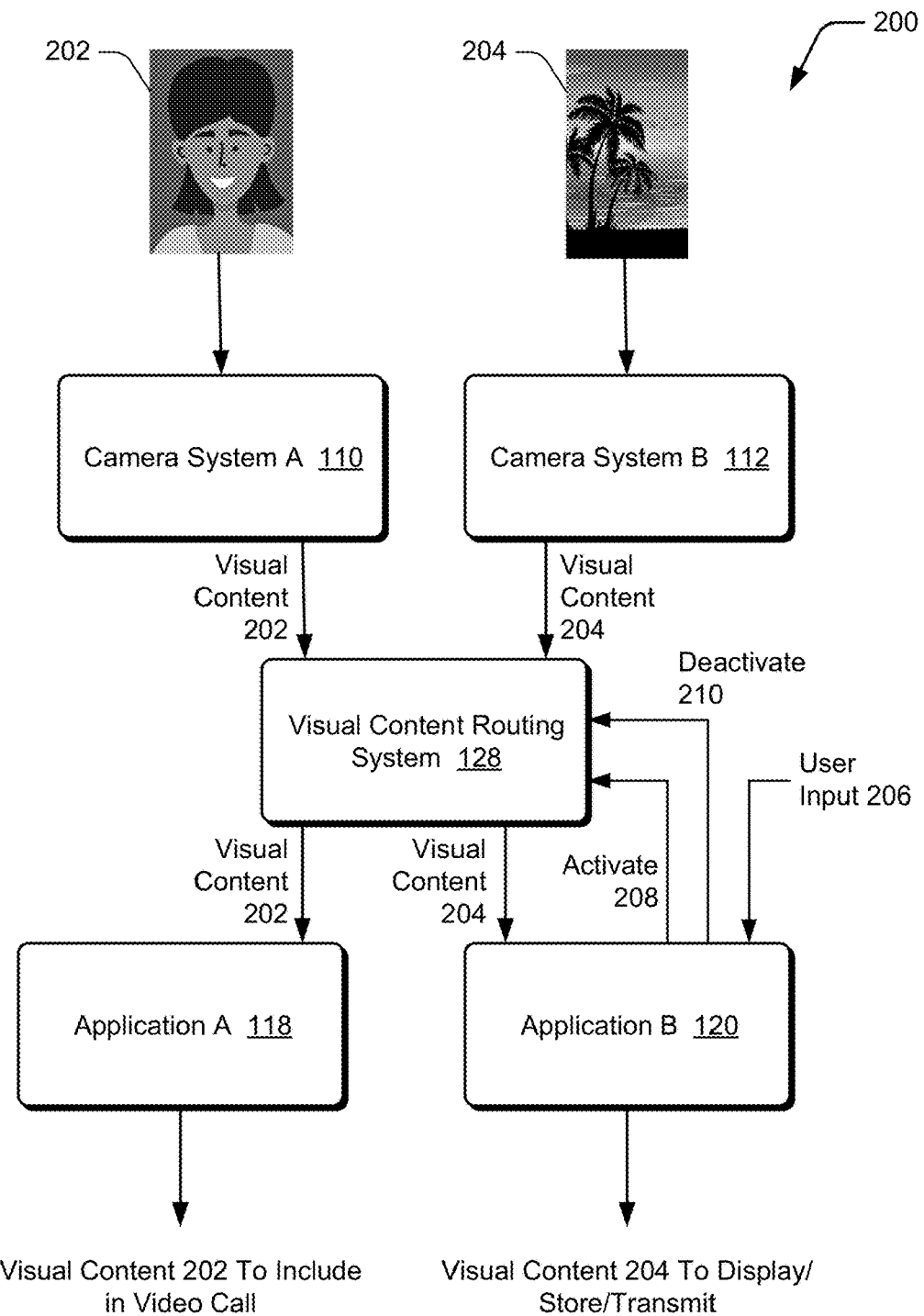
FIG. 2 illustrates an example system implementing the techniques discussed herein.

FIG. 2 illustrates an example system 200 implementing the techniques discussed herein. The system 200 includes two camera systems 110 and 112, two applications 118 and 120, and a visual content routing system 128. The camera system 110 captures visual content 202 and the camera system 112 captures visual content 204. In the illustrated example system 200 the camera system 110 is a front facing camera system and the visual content 202 is of the user during a video call. A video call refers to a live communication between the computing device 102 and one or more remote devices 124 where video and typically audio is transmitted between the devices. E.g., the video call can be a video conference including multiple users each of which communicates to the other devices visual content captured at their respective devices (e.g., visual content that includes the users at their respective devices). Such video calls can also include users sharing their screens, sharing images or other files, users chatting or texting one another, and so forth. Although a single image is illustrated as the visual content 202, it is to be appreciated that the camera system 110 can capture a series of images or video during a video call.

Also in the illustrated example system 200 the camera system 112 is a rear facing camera system (or a side facing camera system) and the visual content 204 is of scenery that the user can see during the video call. Although a single image is illustrated as the visual content 204, it is to be appreciated that the camera system 112 can capture a series of images or video.

The visual content routing system 128 receives the visual content 202 and routes the visual content 202 to the application 118. The visual content routing system 128 also receives the visual content 204 and routes the visual content 204 to the application 120. In the illustrated example 200, the application 118 is a video calling application and outputs the visual content 202 as part of the video call. In the illustrated example 200, the application 120 is a photography application that allows the user to capture images, store images, edit images, print images, view images, transmit images to other devices (e.g., via text message, email, social media posting), and so forth. Accordingly, the application 120 communicates the visual content 204 to the appropriate component of the computing device 102 to have the visual content 204 displayed, stored, transmitted, combinations thereof, and so forth. Although reference is made to the application 120 being a photography application, the application 120 can be any application that processes, stores, transmits, and so forth visual content.

The visual content routing system 128 routes the visual content 202 to the application 118 concurrently with routing the visual content 204 to the application 120. Accordingly, the camera system 110 and the camera system 112 are both powered on and actively capturing images at the same time. For example, the visual content 202 and the visual content 204 can be captured at the exact same moment in time. It should further be noted that the applications 118 and 120 can be unaware of each other and need not be aware of (and typically are not aware of) the visual content being provided to the other. E.g., the visual content routing system 128 does not route the visual content 204 to the application 118 and does not route the visual content 202 to the application 120.

The visual content routing system 128 can route visual content 202 to application 118 in any of a variety of different manners. In one or more implementations, the visual content 202 is provided to the visual content routing system 128 by the visual content routing system 128 invoking an application programming interface (API) exposed by a program running as part of the camera system 110 to pass the visual content 202 to the visual content routing system 128, or by a program running as part of the camera system 110 invoking an API exposed by the visual content routing system 128 to pass the visual content 202 to the visual content routing system 128. Additionally or alternatively, the visual content routing system 128 knows where in memory of the computing device 102 the visual content 202 is stored (e.g., a buffer that is refreshed by the camera system 110 with new visual content 30 or 60 times per second) and retrieves the visual content 202 from that location in memory. Additionally or alternatively, the visual content routing system 128 notifies the application 118 where in memory of the computing device 102 the visual content 202 is stored (e.g., a buffer that is refreshed by the camera system 110 with new visual content 30 or 60 times per second) and retrieves the visual content 202 from that location in memory. The visual content routing system 128 can similarly route visual content 204 to application 120 in any of a variety of different manners.

The visual content routing system 128 can determine which visual content 202 or 204 to route to which application 118 or 120 in any of a variety of different manners. In one or more implementations, the visual content routing system 128 includes default settings, such as having visual content form a front facing camera system routed to an application that is a video calling or video conferencing application, and visual content from a rear facing camera system routed to an application that is photography application. Additionally or alternatively, the visual content routing system 128 provides a user interface allowing the user to provide a configuration setting input specifying which of multiple applications 118, 120 is to receive the visual content captured by which of multiple camera systems. Additionally or alternatively, one or more of the applications 118 or 120 provides a user interface allowing the user to provide a configuration setting input specifying which camera system the application is to receive visual content from. The application 118 or 120 that receives this user input provides the user input to the visual content routing system 128, which in turn routes the visual content from the user specified camera system to the application.

In one or more implementations, the camera system 110 is powered on in response to a request to use the application 118. For example, in response to user input requesting to run the application 118, in response to user input requesting to activate the camera system 110, in response to user input requesting to start a video call or video conference, and so forth. The camera system 112 need not be (and typically is not) powered on until a request to use the application 120 is received. A request to use the application 120 can be received as user input 206, which can take any of a variety of forms, such as selection of an icon or button corresponding to the application 120 (e.g., an icon or button overlaid on a display of the video call), input of a voice command to launch or run the application 120, input of a gesture or hand motion, and so forth. In response to the user input 206, the application 120 communicates an activate signal 208 to the visual content routing system 128, which in turn powers on the camera system 112 and routes the visual content 204 to the application 120. Subsequently, in response to user input 206 requesting to close or shut down the application 120 (or make the application 120 a background application), the application 120 communicates a deactivate signal 210 to the visual content routing system 128, which in turn powers down the camera system 112 and ceases routing the visual content 204 to the application 120.

In one or more embodiments, in response to user input 206 requesting to use the application 120, the operating system 116 makes the application 118 a background application and the application 120 the foreground application. As the foreground application, the application can display the visual content captured by the camera system 112 (e.g., can open a camera viewfinder and display the captured visual content). As a background application, the visual content captured by the camera system 110 is not displayed by the application 118. However, despite being a background application, the application 118 remains running and maintains the video call. Accordingly, visual content 202 can still be received and routed to the application 118 for communication to various remote devices via the video call despite the application 118 being a background application.

Furthermore, in response to user input 206 requesting to close or shut down the application 120 (or make the application 120 a background application), the operating system makes the application 120 a background application and the application 118 the foreground application. Accordingly, the application 120 ceases displaying the visual content captured by the camera system 112. However, despite being a background application, the application 120 optionally remains running, continues to receive visual content 202, and stores, transmits, process, etc. the received visual content 202. As the foreground application, the application 120 display the visual content captured by the camera system 110.

In one or more embodiments, when the application 120 is the foreground application, an indication is displayed to the user that the computing device 102 is still engaged in a video call even though the visual content for the video call may not be displayed. This indication can be provided by any of various components of the computing device 102, such as the application 120, the operating system 116, the visual content routing system 128, and so forth.

Figure 3:
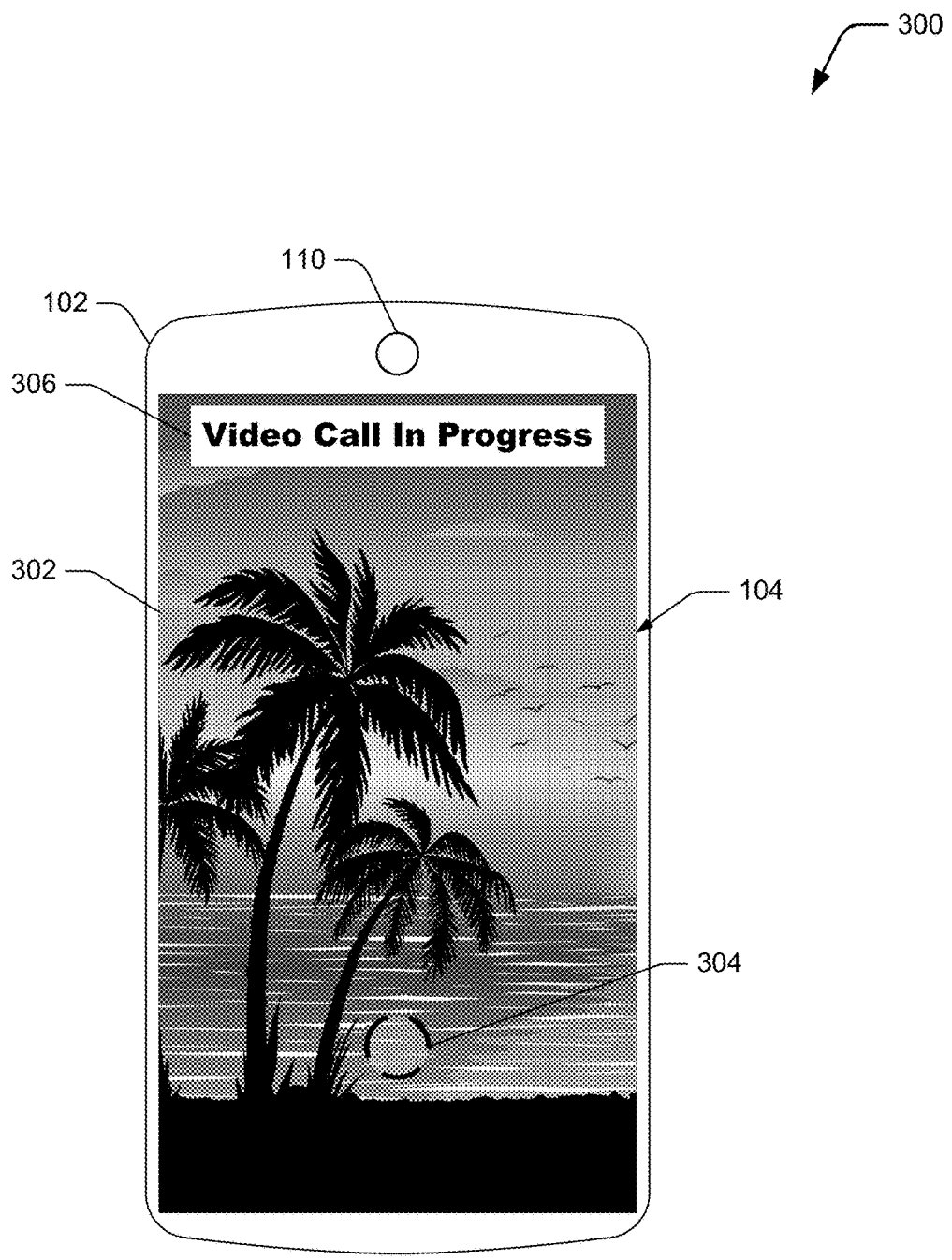
FIG. 3 illustrates an example of the usage of the techniques discussed herein.

FIG. 3 illustrates an example 300 of the usage of the techniques discussed herein. In the example 300, a computing device 102 includes a front facing camera system 110. In response to receiving an input requesting to use a photography application (e.g., application 120), the application 120 becomes the foreground application and displays the visual content 302 captured by a rear facing camera (e.g., the camera system 112 of FIG. 1, not shown in FIG. 3) on the display 104. In one or more implementations, the display of visual content captured by the rear facing camera is a live capture—the camera system 112 captures still images at a particular rate (e.g., 30 frames per second or 60 frames per second) and these are displayed on the display 104. The application 120 also displays a shutter button 304, which is user selectable to cause the rear facing camera to save one of the captured images from the rear facing camera (e.g., for transmission to another device, for retrieval by the computing device 102 at a later time, and so forth).

In the example 300, a notification 306 is also displayed. The notification 306 is an indication to the user that although the visual content 302 is displayed on the display 104, the computing device 102 is still engaged in a video call. In the illustrated example, the notification 306 is text reminding the user that the computing device 102 is still engaged in a video call. The notification 306 is optionally user selectable, user selection of which causes the operating system 116 to make the video call application (e.g., application 118 of FIG. 2) the foreground application and the photography application (e.g., application 120 of FIG. 2) a background application.

Thus, as illustrated in the example 300, while in a video call with a first camera system (e.g., camera system 110) capturing video for the video call application, a user is able to capture one or more images unrelated to the video call using a second camera system (e.g., camera system 112) and have those one or more images displayed with another application (e.g., a photography application). The video call is not disrupted by the capturing of the one or more images by the second camera system, e.g., allowing the user to capture and save an image of a sunset while engaged in a video call. However, the user is notified that he or she is still in the video call and that visual content is still being captured by the first camera system. Furthermore, the one or more images captured by the second camera system are not routed to or shared with the video call application, so the other participants in the video call application are given no indication that the user has captured the one or more images with the second camera system.

Figure 4:
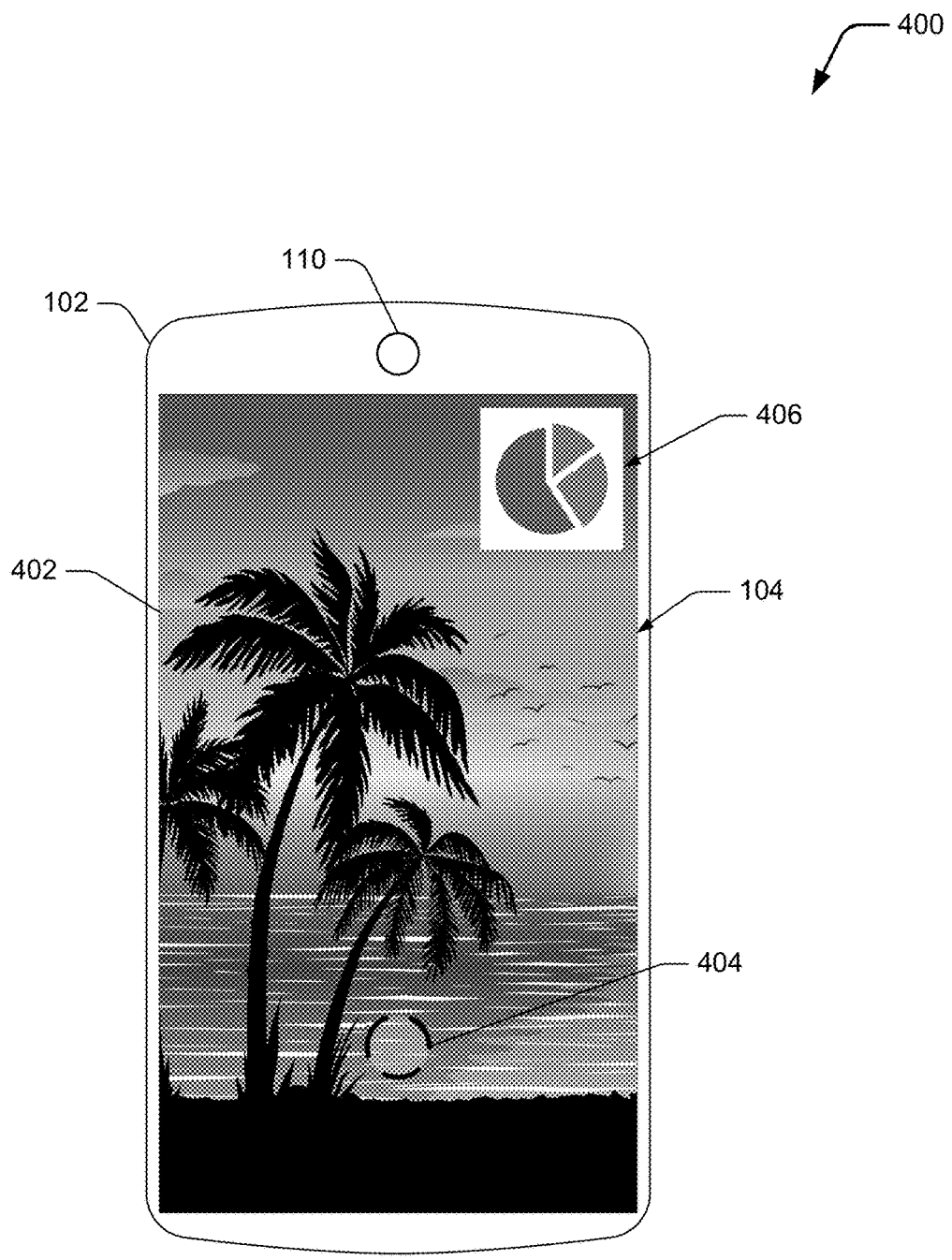
FIG. 4 illustrates another example of the usage of the techniques discussed herein.

FIG. 4 illustrates another example 400 of the usage of the techniques discussed herein. In the example 400, a computing device 102 includes a front facing camera system 110. In response to receiving an input requesting to use a photography application (e.g., application 120), the application 120 becomes the foreground application and displays the visual content 402 captured by a rear facing camera (e.g., the camera system 112 of FIG. 1, not shown in FIG. 4) on the display 104. In one or more implementations, the display of visual content captured by the rear facing camera is a live capture—the camera system 112 captures still images at a particular rate (e.g., 30 frames per second or 60 frames per second) and these are displayed on the display 104. The application 120 also displays a shutter button 404, which is user selectable to cause the rear facing camera to save one of the captured images from the rear facing camera (e.g., for transmission to another device, for retrieval by the computing device 102 at a later time, and so forth).

In the example 400, a notification 406 is also displayed. The notification 406 is an indication to the user that although the visual content 402 is displayed on the display 104, the computing device 102 is still engaged in a video call. In the illustrated example, the notification 406 is an image of content displayed by the video call application, such as an image that was being displayed when the video call application switched to being a background application and the photography application became the foreground application. The image displayed as notification 406 can be obtained in various manners, such as an image provided by the video application to the operating system 116, a screenshot captured by the operating system 116, and so forth. The notification 406 is optionally user selectable, user selection of which causes the operating system 116 to make the video call application (e.g., application 118 of FIG. 2) the foreground application and the photography application (e.g., application 120 of FIG. 2) a background application.

Thus, as illustrated in the example 400, while in a video call with a first camera system (e.g., camera system 110) capturing video for the video call application, a user is able to capture one or more images unrelated to the video call using a second camera system (e.g., camera system 112) and have those one or more images displayed with another application (e.g., a photography application). The video call is not disrupted by the capturing of the one or more images by the second camera system, e.g., allowing the user to capture an image of a sunset while engaged in a video call. However, the user is notified that he or she is still in the video call and that visual content is still being captured by the first camera system. Furthermore, the one or more images captured by the second camera system are not routed to or shared with the video call application, so the other participants in the video call application are given no indication that the user has captured the one or more images with the second camera system.

Figure 5:
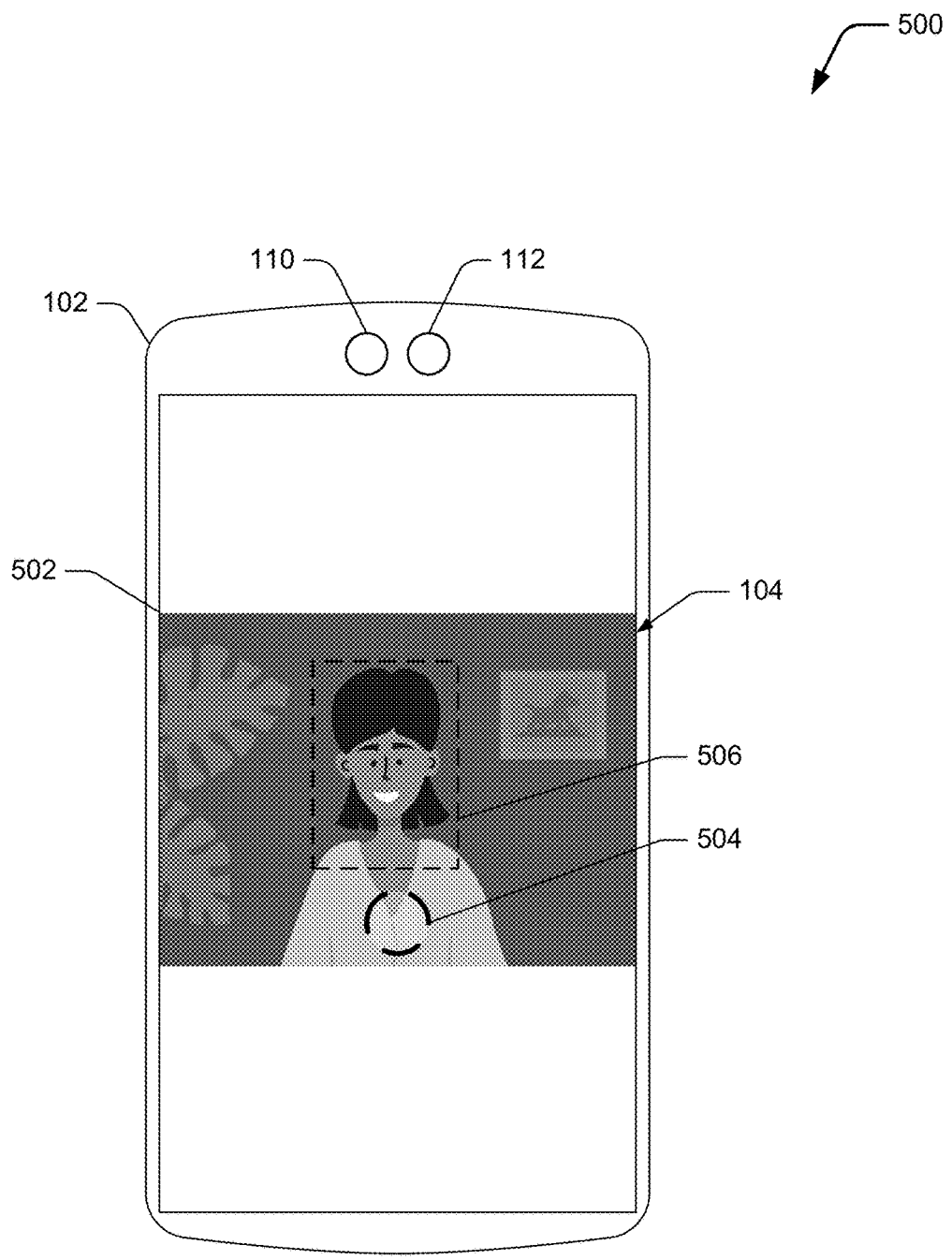
FIG. 5 illustrates another example of the usage of the techniques discussed herein.

FIG. 5 illustrates another example 500 of the usage of the techniques discussed herein. In the example 500, a computing device 102 includes two front facing camera systems 110 and 112. The camera system 110 includes a telephoto or portrait lens, allowing visual content to be captured including predominantly a face of a user (e.g., to avoid too much background being displayed during a video call). The front facing camera system 112 includes a wide angle lens, allowing visual content including more background of a user to be captured than is captured with the camera system 110.

In response to receiving an input requesting to use a photography application (e.g., application 120), the application 120 becomes the foreground application and displays the visual content 502 captured by the camera system 112 on the display 104. In one or more implementations, the display of visual content captured by the camera system 112 is a live capture—the camera system 112 captures still images at a particular rate (e.g., 30 frames per second or 60 frames per second) and these are displayed on the display 104. The application 120 also displays a shutter button 504, which is user selectable to cause the camera system 112 to save one of the captured images from the rear facing camera (e.g., for transmission to another device, for retrieval by the computing device 102 at a later time, and so forth).

In the example 500, an indication 506 is also displayed. The indication 506 is an indication of the visual content that the camera system 110 is capturing. As the camera systems 110 and 112 are facing the same direction and one includes a telephoto or portrait lens while the other includes a wide angle lens, the visual content captured by the camera system 110 overlaps (e.g., is a subset of) the visual content captured by the camera system 112. The application 120 can determine which of the visual content the camera system 110 is capturing in any of a variety of different manners. In one or more implementations, the application 120 is aware of the focal length of the lens (e.g., obtained from the operating system 116 or the application 118) and using the focal length can readily determine the visual content captured by the camera system 110 relative to the visual content captured by the camera system 112. Additionally or alternatively, the application 120 can obtain an image of content displayed by the video call application (an image provided by the video application to the operating system 116, a screenshot captured by the operating system 116, and so forth), such as an image that was being displayed when the video call application switched to being a background application and the photography application became the foreground application. The application 120 can compare the image of content displayed by the visual content application to the visual content captured by the camera system 112 (e.g., at the time the photography application became the foreground application) and determine a match (e.g. a best match) between the image and the visual content captured by the camera system 112.

The indication 506 is optionally user selectable. E.g., the display 104 can be a touchscreen and the user touching the area of the display 104 where the indication 506 is displayed is user selection of the indication 506. User selection of the indication 506 causes the operating system 116 to make the video call application (e.g., application 118 of FIG. 2) the foreground application and the photography application (e.g., application 120 of FIG. 2) a background application.

Thus, as illustrated in the example 500, while in a video call with a first camera system (e.g., camera system 110) capturing video for the video call application, a user is able to capture one or more images using a second camera system (e.g., camera system 112) and have those one or more images displayed with another application (e.g., a photography application). The video call is not disrupted by the capturing of the one or more images by the second camera system, e.g., allowing the user to capture and save an image of a sunset while engaged in a video call. However, the user is notified that he or she is still in the video call and of what visual content being captured by the first camera system for the video call (e.g., allowing the user to ensure that anything in the background he or she does not want included in the video call is not included despite capturing wider angle views by the photography application). Furthermore, the one or more images captured by the second camera system are not routed to or shared with the video call application, so the other participants in the video call application are given no indication that the user has captured the one or more images with the second camera system.

Figure 6:
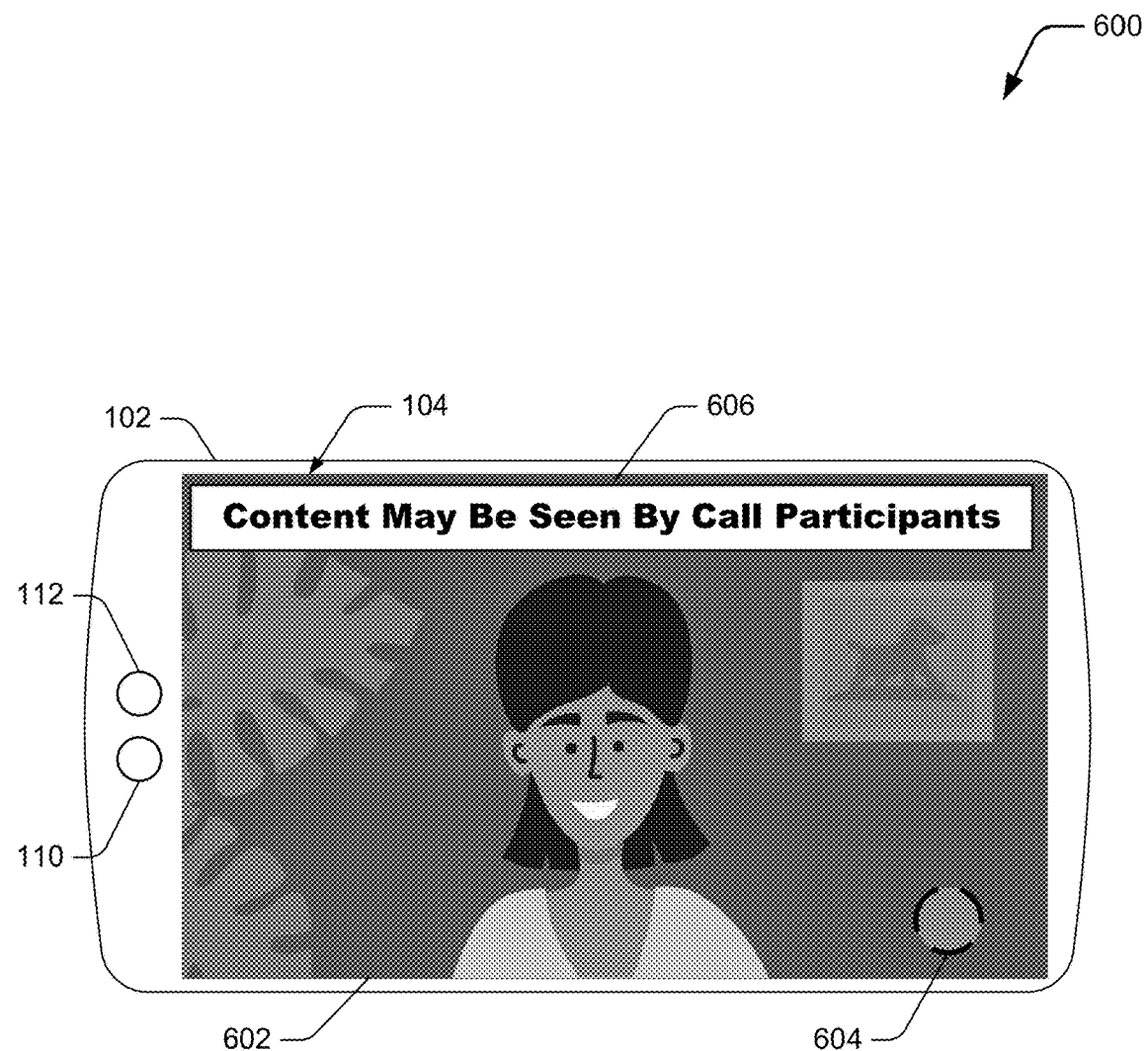
FIG. 6 illustrates another example of the usage of the techniques discussed herein.

FIG. 6 illustrates another example 600 of the usage of the techniques discussed herein. In the example 600, a computing device 102 includes two front facing camera systems 110 and 112. The camera system 110 includes a telephoto or portrait lens, allowing visual content to be captured including predominantly a face of a user (e.g., to avoid too much background being displayed during a video call). The front facing camera system 112 includes a wide angle lens, allowing visual content including more background of a user to be captured than is captured with the camera system 110.

In response to receiving an input requesting to use a photography application (e.g., application 120), the application 120 becomes the foreground application and displays the visual content 602 captured by the camera system 112 on the display 104. In one or more implementations, the display of visual content captured by the camera system 112 is a live capture—the camera system 112 captures still images at a particular rate (e.g., 30 frames per second or 60 frames per second) and these are displayed on the display 104. The application 120 also displays a shutter button 604, which is user selectable to cause the camera system 112 to save one of the captured images from the rear facing camera (e.g., for transmission to another device, for retrieval by the computing device 102 at a later time, and so forth).

In the example 600, a notification 606 is also displayed. The notification 606 is an indication to the user that although the visual content 602 is displayed on the display 104, the computing device 102 is still engaged in a video call and because camera systems 110 and 112 are both front facing, visual content displayed by the application 120 may also be captured by the camera system 110 and seen by the participants of the video call. The notification 606 is optionally user selectable, user selection of which causes the operating system 116 to make the video call application (e.g., application 118 of FIG. 2) the foreground application and the photography application (e.g., application 120 of FIG. 2) a background application. Additionally or alternatively an indication of the visual content that the camera system 110 is capturing is displayed, analogous to the indication 506 of FIG. 5.

Thus, as illustrated in the example 600, while in a video call with a first camera system (e.g., camera system 110) capturing video for the video call application, a user is able to capture one or more images using a second camera system (e.g., camera system 112) and have those one or more images displayed with another application (e.g., a photography application). The video call is not disrupted by the capturing of the one or more images by the second camera system, e.g., allowing the user to capture and save an image of a sunset while engaged in a video call. However, if a user chooses a camera system which overlaps wholly or partly with the visual content being captured by the first camera system and transmitted as part of the video call, an alert is provided to the user to make the user cognizant of the fact that live capture feed may be also seen by other participants in the video call. Furthermore, the one or more images captured by the second camera system are not routed to or shared with the video call application, so the other participants in the video call application are given no indication that the user has captured the one or more images with the second camera system.

Returning to FIG. 1, in one or more embodiments audio or other content in addition to (or in place of) visual content is also routed to the application 120 and stored, transmitted, processed, and so forth. Whether audio content is routed to the application 120 can vary based on various rules and settings of the computing device 102. In one or more implementations, the visual content routing system 128 detects whether audio from the application 118 (e.g., audio played back by the application 118) will be captured by the microphone 106. This detection can be made in various manners, such as receiving an indication from the application 118 or the operating system 116 of whether audio content from application 118 is muted (e.g., if muted there is no audio played back by the application 118 that will be captured by the microphone 106), whether speaker 108 is muted (e.g., if muted there is no audio played back by the application 118 that will be captured by the microphone 106), whether speaker 108 is a headset (e.g., if a headset then audio played back by the application 118 will not be captured by the microphone 106), and so forth. If audio from the application 118 will not be captured by the microphone 106 then audio content captured by the microphone 106 is routed to the application 120 and thus is stored, transmitted, processed, and so forth by the application 120. However, if audio from the application 118 will be (or might be) captured by the microphone 106 then audio content captured by the microphone 106 is not routed to the application 120 and thus is not stored, transmitted, processed, and so forth by the application 120.

By determining whether to route audio data to the application 120 based on whether audio from the application 118 will be captured by the microphone 106, audio from the application 118 remains secure within application 118 and is not made available to other applications on the computing device 102. For example, if the application 118 is a video call application and audio from the video call is being played back by a speaker 108 that is not a headset, audio data from the microphone 106 is not routed to the application 120. Thus, audio from the video call will not be routed to the application 120 and will not be stored, transmitted, processed, and so forth by the application 120.

Figure 7:
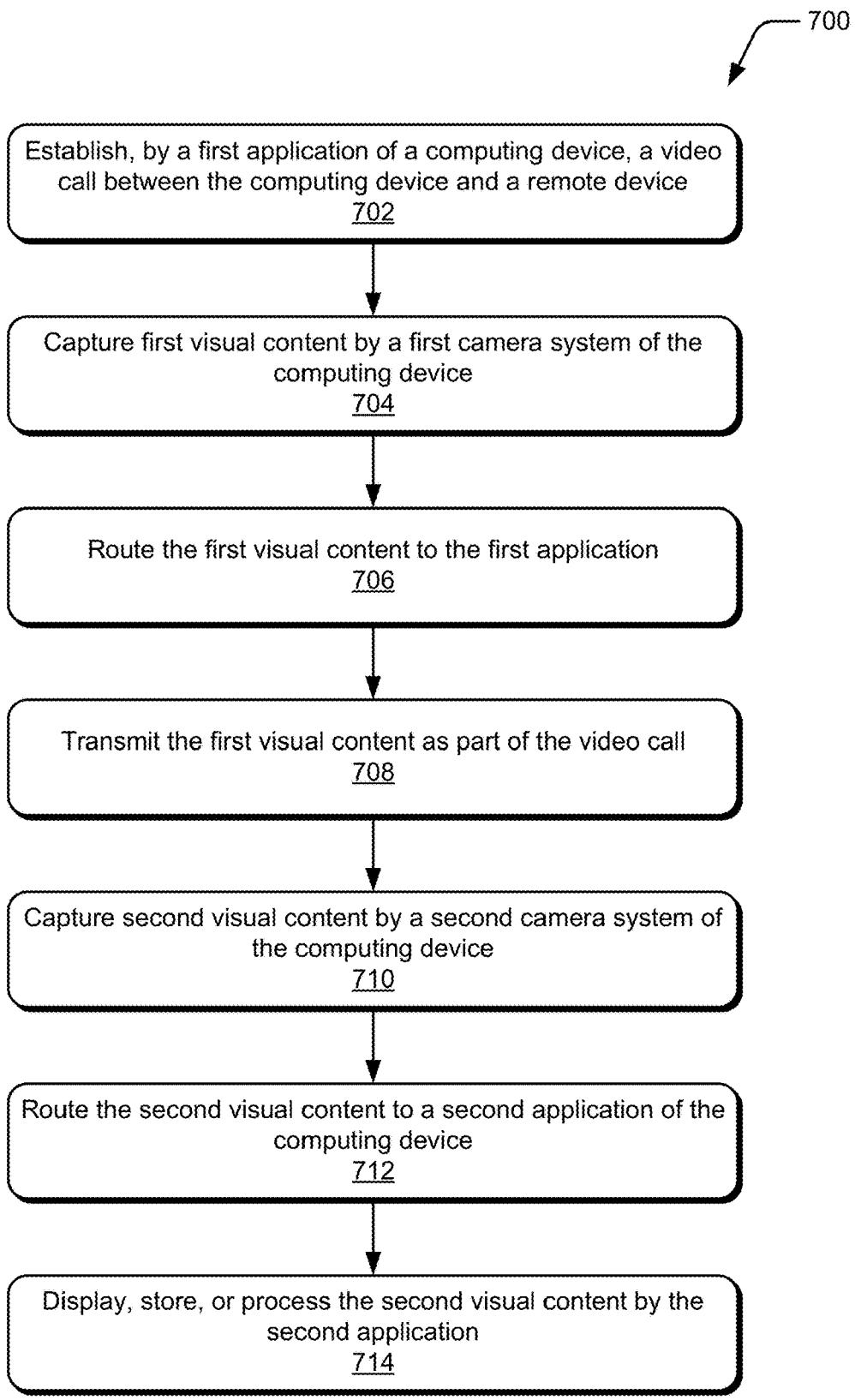
FIG. 7 illustrates an example process for implementing the techniques discussed herein in accordance with one or more embodiments.

FIG. 7 illustrates an example process 700 for implementing the techniques discussed herein in accordance with one or more embodiments. Process 700 is carried out by a visual content routing system, such as visual content routing system 128 of FIG. 1 or FIG. 2, and can be implemented in software, firmware, hardware, or combinations thereof. Process 700 is shown as a set of acts and is not limited to the order shown for performing the operations of the various acts.

In process 700, a video call between a computing device and a remote device is established (act 702). The video call is established by a first application of the computing device, such as a video call (e.g., video conferencing) application.

First visual content is captured by a first camera system of the computing device (act 704). The first camera system can be, for example, a front facing camera system.

The first visual content is routed to the first application (act 706). Note that the first visual content need not be, and typically is not, routed to any other application on the computing device.

The first visual content captured form the first camera system is transmitted as part of the video call (act 708). Accordingly, the first visual content is transmitted to the remote device as part of the video call.

Second visual content is captured by a second camera system of the computing device (act 710). The second camera system can be, for example, a rear facing camera system.

The second visual content is routed to a second application of the computing device (act 712). The second application is, for example, a photography application allowing the user to display, store, transmit, process, and so forth captured visual content. Audio content is also optionally routed to the second application, such as in situations in which audio played back by the first application will not be recorded by a microphone of the computing device. The second visual content is not routed to the first application and the first application need not have knowledge that the second visual content was captured or routed to the second application.

The second visual content is displayed, stored, processed by, etc. by the second application (act 714).

Figure 8:
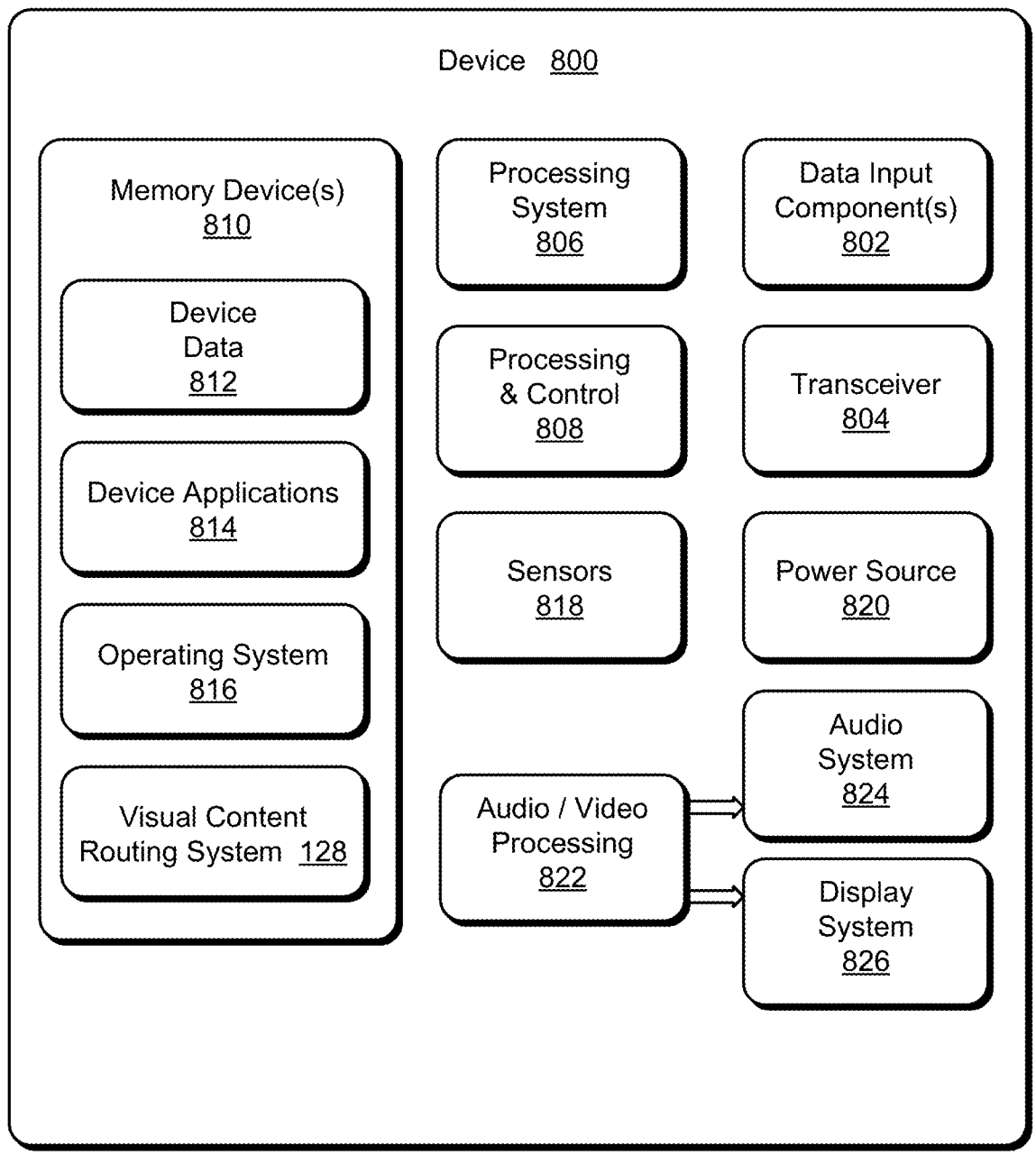
FIG. 8 illustrates various components of an example electronic device that can implement embodiments of the techniques discussed herein.

FIG. 8 illustrates various components of an example electronic device that can implement embodiments of the techniques discussed herein. The electronic device 800 can be implemented as any of the devices described with reference to the previous FIGS., such as any type of client device, mobile phone, tablet, computing, communication, entertainment, gaming, media playback, or other type of electronic device. In one or more embodiments the electronic device 800 includes the visual content routing system 128, described above.

The electronic device 800 includes one or more data input components 802 via which any type of data, media content, or inputs can be received such as user-selectable inputs, messages, music, television content, recorded video content, and any other type of text, audio, video, or image data received from any content or data source. The data input components 802 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 802 may also include various other input components such as microphones, touch sensors, touchscreens, keyboards, and so forth.

The device 800 includes communication transceivers 804 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 800 includes a processing system 806 of one or more processors (e.g., any of microprocessors, controllers, and the like) or a processor and memory system implemented as a system-on-chip (SoC) that processes computer-executable instructions. The processing system 806 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 808. The device 800 may further include any type of a system bus or other data and command transfer system that couples the various components within the device. A system bus can include any one or combination of different bus structures and architectures, as well as control and data lines.

The device 800 also includes computer-readable storage memory devices 810 that enable data storage, such as data storage devices that can be accessed by a computing device, and that provide persistent storage of data and executable instructions (e.g., software applications, programs, functions, and the like). Examples of the computer-readable storage memory devices 810 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 800 may also include a mass storage media device.

The computer-readable storage memory device 810 provides data storage mechanisms to store the device data 812, other types of information or data, and various device applications 814 (e.g., software applications). For example, an operating system 816 can be maintained as software instructions with a memory device and executed by the processing system 806. The device applications 814 may also include a device manager, such as any form of a control application, software application, signal-processing and control module, code that is native to a particular device, a hardware abstraction layer for a particular device, and so on.

The device 800 can also include one or more device sensors 818, such as any one or more of an ambient light sensor, a proximity sensor, a touch sensor, an infrared (IR) sensor, accelerometer, gyroscope, thermal sensor, audio sensor (e.g., microphone), and the like. The device 800 can also include one or more power sources 820, such as when the device 800 is implemented as a mobile device. The power sources 820 may include a charging or power system, and can be implemented as a flexible strip battery, a rechargeable battery, a charged super-capacitor, or any other type of active or passive power source.

The device 800 additionally includes an audio or video processing system 822 that generates one or both of audio data for an audio system 824 and display data for a display system 826. In accordance with some embodiments, the audio/video processing system 822 is configured to receive call audio data from the transceiver 804 and communicate the call audio data to the audio system 824 for playback at the device 800. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for routing visual content from different camera systems to different applications during video call have been described in language specific to features or methods, the subject of the appended claims is not necessarily limited to the specific features or methods described. Rather, the specific features and methods are disclosed as example implementations of techniques for implementing routing visual content from different camera systems to different applications during video call. Further, various different embodiments are described, and it is to be appreciated that each described embodiment can be implemented independently or in connection with one or more other described embodiments. Additional aspects of the techniques, features, and/or methods discussed herein relate to one or more of the following:

A method comprising: establishing, by a first application of a computing device, a video call between the computing device and a remote device; capturing first visual content by a first camera system of the computing device; routing the first visual content to the first application; transmitting the first visual content captured from the first camera system as part of the video call; capturing second visual content by a second camera system of the computing device; routing the second visual content to a second application of the computing device without routing the second visual content to the first application and without routing the first visual content to the second application; and displaying or storing, by the second application, the second visual content.

Alternatively or in addition to the above described method, any one or combination of the following. The method further comprising receiving a user input requesting capture of the second visual content, and the capturing the second visual content comprising capturing the second visual content in response to the user input. The method further comprising making, in response to the user input, the second application a foreground application and the first application a background application. The second camera system facing an opposite direction as the first camera system. The routing the second visual content comprising routing the second visual content to the second application concurrently with routing the first visual content to the first application. The transmitting comprising transmitting the first visual content to a remote device as part of the video call without displaying the first visual content at the computing device. The method further comprising displaying, with the second visual content, a notification that the video call is still in process. The first camera system and the second camera system facing a same direction but having lenses with different focal lengths. The displaying further comprising displaying, with the second visual content, an indication of the first visual content. The displaying further comprising displaying, with the second visual content, an indication that at least part of the second visual content is also captured by the first camera system and transmitted as part of the video call. The method further comprising capturing, concurrently with capturing the second visual content, audio content, and storing the second visual content and the audio content. The method further comprising detecting that the first application is using a headset or that a speaker of the computing device is muted, and the capturing the audio content comprising capturing the audio content in response to detecting that the first application is using the headset or that the speaker of the computing device is muted.

A computing device comprising: a processor implemented in hardware; a first camera system; a second camera system; and a computer-readable storage medium having stored thereon multiple instructions that, responsive to execution by the processor, cause the processor to perform acts including: establishing, by a first application of a computing device, a video call between the computing device and a remote device; capturing first visual content by the first camera system of the computing device; routing the first visual content to the first application; transmitting the first visual content captured from the first camera system as part of the video call; capturing second visual content by the second camera system of the computing device; routing the second visual content to a second application of the computing device without routing the second visual content to the first application and without routing the first visual content to the second application; and displaying or storing, by the second application, the second visual content.

Alternatively or in addition to the above described computing device, any one or combination of the following. The second camera system facing an opposite direction as the first camera system. The routing the second visual content comprising routing the second visual content to the second application concurrently with routing the first visual content to the first application. The first camera system and the second camera system facing a same direction but having lenses with different focal lengths. The 13 displaying further comprising displaying, with the second visual content, an indication of the first visual content.

A system comprising: a first camera system; a second camera system; a first application to cause a video call to be established between the computing device and a remote device; a second application to cause visual content to be displayed or stored; and a visual content routing system, implemented at least in part in hardware, to concurrently route first visual content captured by the first camera system to the first application and second visual content captured by the second camera system to the second application, the first application further causing the first visual content to be communicated to the remote device as part of the video call, the second application causing the second visual content to be displayed or stored.

Alternatively or in addition to the above described system, any one or combination of the following. The second camera system facing an opposite direction as the first camera system. The first camera system and the second camera system facing a same direction but having lenses with different focal lengths. The system wherein the second application is further to cause an indication of the first visual content to be displayed with the second visual content.

What is claimed is:

1. A method comprising:
   establishing, by a first application of a computing device, a video call between the computing device and a remote device;
   capturing first visual content by a first camera system of the computing device;
   routing the first visual content to the first application;
   transmitting the first visual content captured from the first camera system as part of the video call;
   capturing second visual content by a second camera system of the computing device concurrently while the first camera system captures the first visual content;
   routing the second visual content to a second application of the computing device without routing the second visual content to the first application and without routing the first visual content to the second application, the second visual content being routed to the second application concurrently while the first visual content is routed to the first application; and
   displaying or storing, by the second application, the second visual content.

2. The method of claim 1, further comprising receiving a user input requesting capture of the second visual content, and the capturing the second visual content comprising capturing the second visual content in response to the user input.

3. The method of claim 2, further comprising making, in response to the user input, the second application a foreground application and the first application a background application.

4. The method of claim 1, the second camera system facing an opposite direction as the first camera system.

5. The method of claim 1, the transmitting comprising transmitting the first visual content to the remote device as part of the video call without displaying the first visual content at the computing device.

6. The method of claim 1, further comprising displaying, with the second visual content, a notification that the video call is still in process.

7. The method of claim 1, the first camera system and the second camera system facing a same direction but having lenses with different focal lengths.

8. The method of claim 7, the displaying further comprising displaying, with the second visual content, an indication of the first visual content.

9. The method of claim 7, the displaying further comprising displaying, with the second visual content, an indication identifying a portion of the second visual content that is also captured by the first camera system, the portion of the second visual content corresponding to the first visual content and being routed to the first application and transmitted as part of the video call concurrently while the second visual content is routed to the second application.

10. The method of claim 1, further comprising capturing, concurrently with capturing the second visual content, audio content, and storing the second visual content and the audio content.

11. The method of claim 10, further comprising detecting that the first application is using a headset or that a speaker of the computing device is muted, and the capturing the audio content comprising capturing the audio content in response to detecting that the first application is using the headset or that the speaker of the computing device is muted.

12. The method of claim 10, further comprising routing the second visual content to the second application without routing the audio content to the second application in response to detecting that a speaker of the computing device is playing back audio of the first application.

13. A computing device comprising:
    a processor implemented in hardware;
    a first camera system;
    a second camera system; and a computer-readable storage medium having stored thereon multiple instructions that, responsive to execution by the processor, cause the processor to perform acts including:
  establishing, by a first application of the computing device, a video call between the computing device and a remote device;
  capturing first visual content by the first camera system of the computing device;
  routing the first visual content to the first application;
  transmitting the first visual content captured from the first camera system as part of the video call;
  capturing second visual content by the second camera system of the computing device concurrently while the first camera system captures the first visual content;
  routing the second visual content to a second application of the computing device without routing the second visual content to the first application and without routing the first visual content to the second application, the second visual content being routed to the second application concurrently while the first visual content is routed to the first application; and
  displaying or storing, by the second application, the second visual content.

14. The computing device of claim 13, the first camera system and the second camera system facing a same direction but having lenses with different focal lengths.

15. The computing device of claim 14, the displaying further comprising displaying, with the second visual content, an indication identifying a portion of the second visual content that is also captured by the first camera system, the portion of the second visual content corresponding to the first visual content and being routed to the first application and transmitted as part of the video call concurrently while the second visual content is routed to the second application.

16. The computing device of claim 13, the displaying further comprising displaying, with the second visual content, an indication of the first visual content.

17. A system comprising:
  a first camera system;
  a second camera system;
  a first application to cause a video call to be established between the system and a remote device;
  a second application to cause visual content to be displayed or stored; and
  a visual content routing system, implemented at least in part in hardware, to concurrently route first visual content captured by the first camera system to the first application and second visual content captured by the second camera system to the second application, the first visual content and the second visual content being captured concurrently, the first application further causing the first visual content to be communicated to the remote device as part of the video call concurrently while the second application causes the second visual content to be displayed or stored.

18. The system of claim 17, the second camera system facing an opposite direction as the first camera system.

19. The system of claim 17, the first camera system and the second camera system facing a same direction but having lenses with different focal lengths.

20. The system of claim 19, wherein the second application is further to cause an indication of the first visual content to be displayed with the second visual content.

\* \* \* \* \*